United States Patent
Bursztein

(10) Patent No.: US 7,621,416 B2
(45) Date of Patent: Nov. 24, 2009

(54) COVER OF A CONTAINER, ESPECIALLY OF A VACUUM RECEPTACLE FOR STORAGE OF FOODSTUFFS

(75) Inventor: Slawomir Bursztein, Kielce (PL)

(73) Assignee: Formaster S.A., Kielce (PL)

( * ) Notice: Subject to any disclaimer, the term of this patent is extended or adjusted under 35 U.S.C. 154(b) by 189 days.

(21) Appl. No.: 10/584,840

(22) PCT Filed: Dec. 21, 2004

(86) PCT No.: PCT/PL2004/000109

§ 371 (c)(1),
(2), (4) Date: Jun. 27, 2006

(87) PCT Pub. No.: WO2005/063595

PCT Pub. Date: Jul. 14, 2005

(65) Prior Publication Data
US 2007/0175896 A1 Aug. 2, 2007

(30) Foreign Application Priority Data
Dec. 27, 2003 (PL) .................................. 114558 U

(51) Int. Cl.
*B65D 51/16* (2006.01)
(52) U.S. Cl. ...................... 220/231; 220/368; 220/367.1
(58) Field of Classification Search ................. 220/368, 220/231, 367.1
See application file for complete search history.

(56) References Cited

U.S. PATENT DOCUMENTS

| | | | | |
|---|---|---|---|---|
| 2,173,571 A | * | 9/1939 | Jesnig | 137/854 |
| 2,224,296 A | * | 12/1940 | Hoffman | 215/260 |
| 3,827,596 A | * | 8/1974 | Powers, Jr. | 220/231 |
| 4,210,255 A | * | 7/1980 | Pan | 220/203.15 |
| 4,766,927 A | | 8/1988 | Conatser et al. | |
| 5,121,590 A | * | 6/1992 | Scanlan | 53/510 |
| 5,169,015 A | * | 12/1992 | Burke | 220/203.07 |
| 5,347,918 A | * | 9/1994 | Chen | 99/472 |
| 5,405,038 A | * | 4/1995 | Chuang | 220/231 |
| 5,449,079 A | * | 9/1995 | Yang | 215/228 |
| 5,465,857 A | * | 11/1995 | Yang | 215/228 |
| 5,499,735 A | * | 3/1996 | Chen | 220/231 |
| 5,535,900 A | * | 7/1996 | Huang | 215/228 |
| 5,564,480 A | * | 10/1996 | Chen | 141/65 |
| 5,611,376 A | * | 3/1997 | Chuang | 141/65 |
| 5,941,391 A | * | 8/1999 | Jury | 206/524.8 |

(Continued)

FOREIGN PATENT DOCUMENTS

EP 0524551 7/1991

(Continued)

*Primary Examiner*—Anthony Stashick
*Assistant Examiner*—Christopher B McKinley
(74) *Attorney, Agent, or Firm*—Horst M. Kasper

(57) ABSTRACT

The cover of the container has the hollow (2) with an elliptical outline pointed towards the inside of the container; the hollow has the spherical projection (3), pointed upwards, and the projection has the cylindrical cavity (4) with the opening housing the valve head. The valve head has the form of a circular plate and has an edge with a triangular outline; cooperating with the gasket of the valve. The head valve is installed loosely in the opening by means of the sleeve ending with the flange with distancing projections in the form of radial ribs.

18 Claims, 1 Drawing Sheet

U.S. PATENT DOCUMENTS

Figure 1:
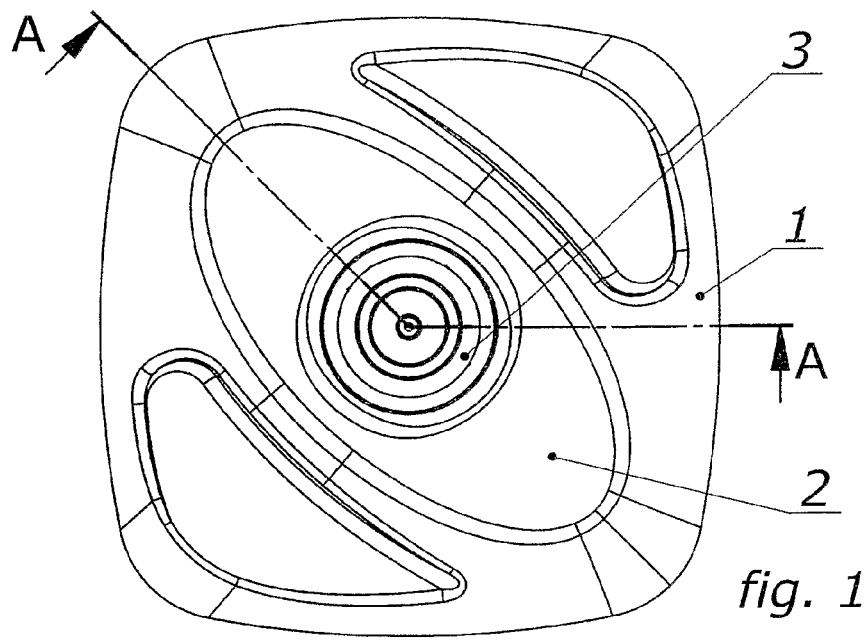

| | | | | |
|---|---|---|---|---|
| 6,035,769 | A * | 3/2000 | Nomura et al. | 99/472 |
| 6,619,493 | B2 * | 9/2003 | Yang | 215/228 |
| 6,637,321 | B2 * | 10/2003 | Wang | 99/472 |
| 6,789,690 | B2 * | 9/2004 | Nieh et al. | 220/231 |
| 6,976,669 | B2 * | 12/2005 | Van Zijll Langhout et al. | 251/342 |
| 7,048,136 | B2 * | 5/2006 | Havens et al. | 220/212 |
| 7,131,550 | B2 * | 11/2006 | Vilalta et al. | 220/231 |
| 2003/0075542 | A1 * | 4/2003 | Lin | 220/203.13 |
| 2003/0141270 | A1 | 7/2003 | Yang | |
| 2003/0197011 | A1 * | 10/2003 | Nieh et al. | 220/231 |
| 2004/0084450 | A1 * | 5/2004 | Havens et al. | 220/203.07 |

FOREIGN PATENT DOCUMENTS

| | | |
|---|---|---|
| EP | 0644128 | 3/1995 |
| FR | 2511347 | 8/1981 |
| JP | 3212382 | 9/1991 |

* cited by examiner

COVER OF A CONTAINER, ESPECIALLY OF A VACUUM RECEPTACLE FOR STORAGE OF FOODSTUFFS

The subject of the invention is a cover of a container, especially of a vacuum receptacle for storage of foodstuffs.

There are known receptacles for storage of foodstuffs having an external outline similar to a rectangular prism with rounded edges and external walls tapering to the bottom. Covers of the containers are made up by shells bulged upwards. The external outline of the cover is delineated by the external and internal rims forming a groove which serves to secure the cover onto the walls of the container. The groove houses a gasket. The cover features a vacuum valve in the form of a plug with a flexible end with a slot which closes when there is a pressure difference. The walls forming the slot are connected by means of couplings with a cylindrical edge of the plug and when pressed, along the slot, pull the walls of the slot apart from each other. Then the valve opens and the pressure inside the container is equalized with the atmospheric pressure. The valve is installed in the sleeve of the cover and the sleeve occupies the loading volume of the container, making it smaller.

The cover of the container, as provided in the invention, has a hollow with an elliptical base, pointed towards the inside of the container; the hollow has a spherical projection, pointed upwards. The projection has a cylindrical cavity with an opening that houses a valve head. The valve head, preferably in the form of a circular plate, has an edge with a triangular outline, cooperating with the gasket of the valve, wherein the head valve is installed loosely in the opening of the cover by means of a sleeve ended with a flange with two distancing projections in the form of radial ribs. The other end of the valve head has a pin used for opening the valve. The lower part of the valve is covered with a bonnet with distancing ribs that allows for air flow while pumping and opening the valve.

In the solution provided in the invention, the vacuum valve is embedded in the cover of the container, which simplifies its construction and does not reduce the volume of the container.

The object of the invention is presented in drawings, wherein

Figure 2:
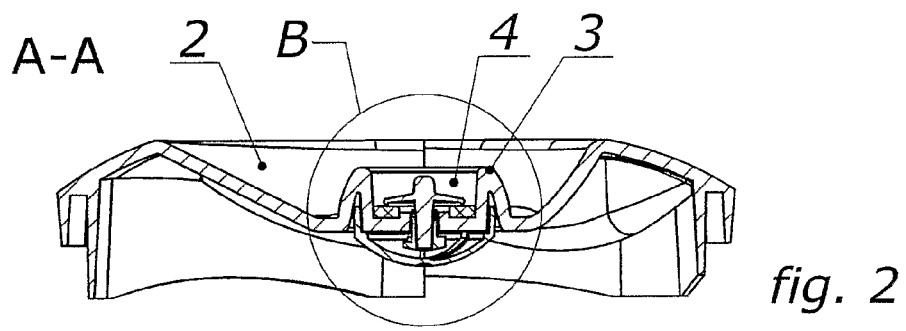
Figure 3:
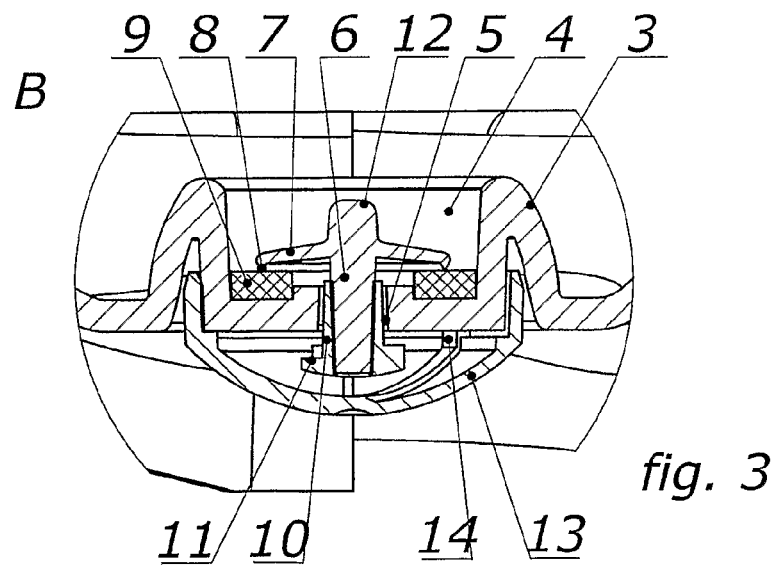

FIG. 1 is a plan view of the cover of the container with a base similar to a square, FIG. 2—cross section A-A of the cover from FIG. 1, and FIG. 3—detail "B" from FIG. 2.

The cover 1 has the hollow 2 with an elliptical outline, pointed towards the inside of the container; the hollow has the spherical projection 3, pointed upwards. The spherical outline of the projection 3 facilitates its cooperation with a nozzle of a vacuum pump because the pump may be put against the projection at an angle. The projection has the cylindrical cavity 4 with the opening 5 with the head valve 6. The head valve 6, in the form of the circular plate 72, has an edge 8 with a triangular outline, cooperating with the gasket 9 of the valve, wherein the head valve is installed loosely in the opening 5 by means of the sleeve 10 ending with the flange 11 equipped with distancing projections in the form of radial ribs. The projections prevent suction of the flange 11 of the sleeve 10 to the cover 1 while pumping air out of the container. The other end of head valve has the pin 12 used for opening of the valve. The valve is opened by pressing a side wall of the pin 12. The lower part of the valve is covered with the bonnet 13 with the distancing ribs 14 which allow for air flow while pumping air and opening the valve

The invention claimed is:

1. A cover for a container comprising
   a shell bulged upwards;
   a hollow (2) having an elliptical outline pointed downwards and towards an inside of the container and disposed in said shell;
   a spherical projection (3), pointed upwards, and disposed in the hollow;
   a cylindrical cavity (4) disposed in the spherical projection (3);
   an opening (5) in a bottom of the cylindrical cavity;
   a valve head (6) formed as a circular plate (7) attached on a lower side in a middle to an end of a cylindrical stem and wherein the cylindrical stem is moveably supported in the opening (5);
      a ring shaped gasket (9) disposed on the bottom of the cylindrical cavity;
      an edge (8) forming a circle and disposed on the circular plate (7), having a triangular outline for engaging with the ring shaped gasket (9), wherein the ring shaped gasket (9) and the edge (8) disposed on the circular plate (7) form a vacuum valve,
      a sleeve (10) ending with the flange (11) with distancing projections in the form of radial ribs, wherein the head valve is installed loosely in the opening (5) by means of the sleeve (10),
   wherein the spherical projection (3) includes an inner ring and an outer ring and wherein a free end of the bonnet engages between the inner ring and the outer ring.

2. The cover according to claim 1 further comprising
   a pin (12) disposed on the circular plate (7) on an upper side of the circular plate (7) disposed opposite to the cylindrical stem and wherein the pin (12) extends beyond the circular plate (7);
   wherein an axis of the cylindrical stem coincides with an axis of the circular plate (7) and with an axis of the pin (12), wherein a diameter of the cylindrical stem is smaller than a diameter of the pin (12) and wherein a length of the cylindrical stem is larger than a length of the sleeve (10); and
   wherein the pin (12) can be pressed sideways for releasing a vacuum in the container by lifting the circular plate (7) on one side from the gasket (9).

3. The cover according to claim 1, further comprising
   a bonnet (13) disposed below a bottom end of the cylindrical stem;
   distancing ribs (14) attached to the bonnet (13).

4. The cover according to claim 1, wherein the cylindrical stem and the circular plate (7) are disposed axially aligned with the cylindrical cavity (4) and wherein the edge (8) of the circular plate (7) is axially aligned with the gasket (9).

5. A cover for a container comprising
   a shell bulged upwards;
   a hollow (2) having an elliptical outline pointed downwards and towards an inside of the container and disposed in said shell;
   a spherical projection (3), pointed upwards, and disposed in the hollow;
   a cylindrical cavity (4) disposed in the spherical projection (3);
   an opening (5) in a bottom of the cylindrical cavity;
   a valve head (6) formed as a circular plate (7) attached on a lower side in a middle to an end of a cylindrical stem and wherein the cylindrical stem is moveably supported in the opening (5);

a ring shaped gasket (9) disposed on the bottom of the cylindrical cavity;

an edge (8) forming a circle and disposed on the circular plate (7), having a triangular outline for engaging with the ring shaped gasket (9), wherein the ring shaped gasket (9) and the edge (8) disposed on the circular plate (7) form a vacuum valve, a sleeve (10) ending with the flange (11) with distancing projections in the form of radial ribs, wherein the head valve is installed loosely in the opening (5) by means of the sleeve (10), wherein the gasket (9) is ring shaped and flat, wherein the gasket (9) surrounds the cylindrical stem, wherein the gasket (9) is seated at the bottom of the cylindrical cavity (4) and wherein the pin (12) is located completely inside the cylindrical cavity (4) while the valve is in a closed position and wherein an inner diameter of the gasket (9) is smaller than an outer diameter of the circular plate (7) and wherein an outer diameter of the gasket (9) is larger than the outer diameter of the circular plate (7) and wherein a thickness of the gasket (9) is larger than a thickness of the circular plate.

6. The cover according to claim 5, wherein the spherical projection (3) includes an inner ring and an outer ring and wherein a free end of the bonnet engages between the inner ring and the outer ring.

7. The cover according to claim 5 further comprising
a pin (12) disposed on the circular plate (7) on an upper side of the circular plate (7) disposed opposite to the cylindrical stem and wherein the pin (12) extends beyond the circular plate (7);

wherein an axis of the cylindrical stem coincides with an axis of the circular plate (7) and with an axis of the pin (12), wherein a diameter of the cylindrical stem is smaller than a diameter of the pin (12) and wherein a length of the cylindrical stem is larger than a length of the sleeve (10); and wherein the pin (12) can be pressed sideways for releasing a vacuum in the container by lifting the circular plate (7) on one side from the gasket (9).

8. The cover according to claim 6 further comprising
a bonnet (13) disposed below a bottom end of the cylindrical stem;

distancing ribs (14) attached to the bonnet (13).

9. The cover according to claim 6 wherein the cylindrical stem and the circular plate (7) are disposed axially aligned with the cylindrical cavity (4) and wherein the edge (8) of the circular plate (7) is axially aligned with the gasket (9).

10. A cover for a container comprising
a shell bulged upwards;
a hollow (2) pointed downwards and towards an inside of the container and disposed in said shell;
a spherical projection (3), pointed upwards, and disposed in the hollow;
a cylindrical cavity (4) disposed in the spherical projection (3) and open on an upper side;
an opening (5) in a bottom of the cylindrical cavity;

a valve head (6) formed as a circular plate (7) attached on a lower side in a middle to an end of a cylindrical stem and wherein the cylindrical stem is moveably supported in the opening (5);

a ring shaped gasket (9) disposed on the bottom of the cylindrical cavity;

an edge (8) disposed on the circular plate (7) and having a triangular cross-section for engaging with the gasket (9), wherein the gasket (9) and the edge (8) disposed on the circular plate (7) form a vacuum valve.

11. The cover according to claim 10 further comprising
a sleeve (10) ending with the flange (11) with distancing projections in the form of radial ribs, wherein the head valve is installed loosely in the opening (5) by means of the sleeve (10).

12. The cover according to claim 10 further comprising
a pin (12) disposed on the circular plate (7) on an upper side of the circular plate (7) disposed opposite to the cylindrical stem and wherein the pin (12) extends beyond the circular plate (7).

13. The cover according to claim 10 further comprising
a bonnet (13) disposed below a bottom end of the cylindrical stem;
distancing ribs (14) attached to the bonnet (13).

14. The cover according to claim 10, wherein the ring shaped gasket (9) is ring shaped, wherein the ring shaped gasket (9) surrounds the cylindrical stem, wherein the ring shaped gasket (9) is seated at the bottom of the cylindrical cavity (4) and wherein the pin (12) is located completely inside the cylindrical cavity (4) while the valve is in a closed position.

15. The cover according to claim 10 wherein the spherical projection (3) includes an inner ring and an outer ring and wherein a free end of the bonnet engages between the inner ring and the outer ring.

16. The cover according to claim 10 wherein the cylindrical stem and the circular plate (7) are disposed axially aligned with the cylindrical cavity (4) while a vacuum is present in the container and wherein the edge (8) of the circular plate (7) is axially aligned with the ring shaped gasket (9).

17. The cover according to claim 10 wherein the hollow (2) has an elliptical outline.

18. The cover according to claim 10 further comprising
a pin (12) disposed on the circular plate (7) on an upper side of the circular plate (7) disposed opposite to the cylindrical stem and wherein the pin (12) extends beyond the circular plate (7);

wherein an axis of the cylindrical stem coincides with an axis of the circular plate (7) and with an axis of the pin (12), wherein a diameter of the cylindrical stem is smaller than a diameter of the pin (12) and wherein a length of the cylindrical stem is larger than a length of the sleeve (10); and wherein the pin (12) can be pressed sideways for releasing a vacuum in the container by lifting the circular plate (7) on one side from the ring shaped gasket (9).

* * * * *